UNITED STATES PATENT OFFICE.

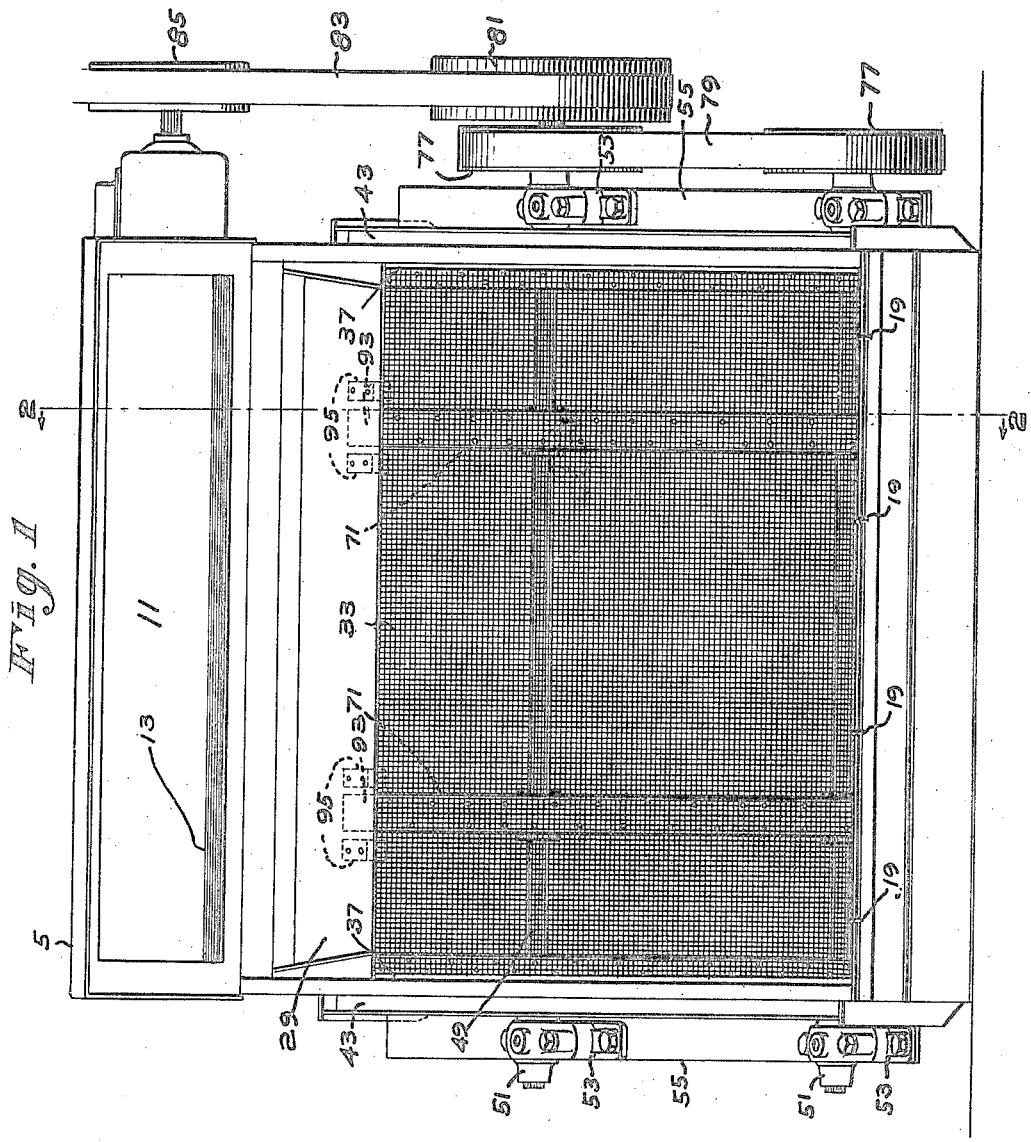

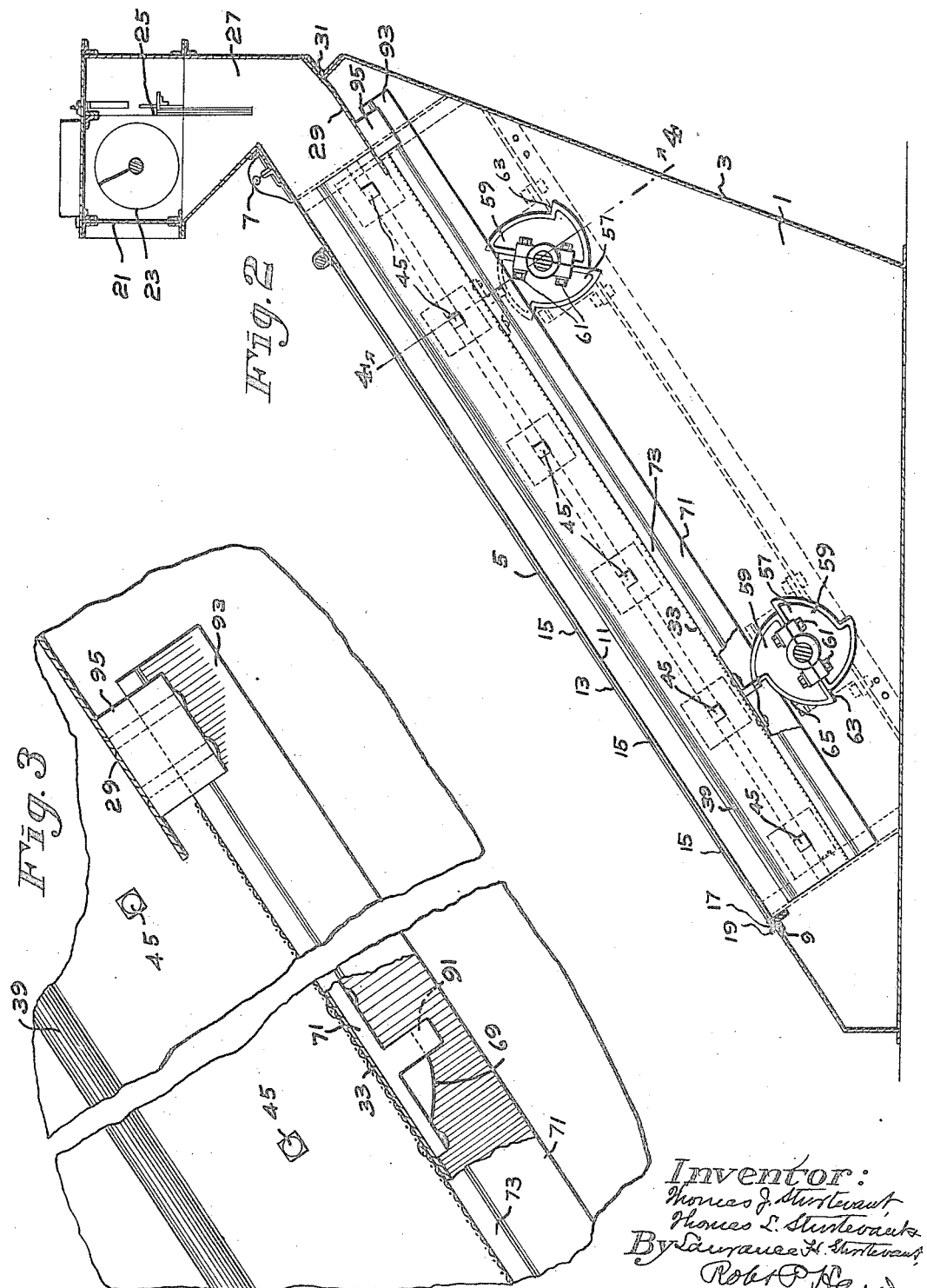

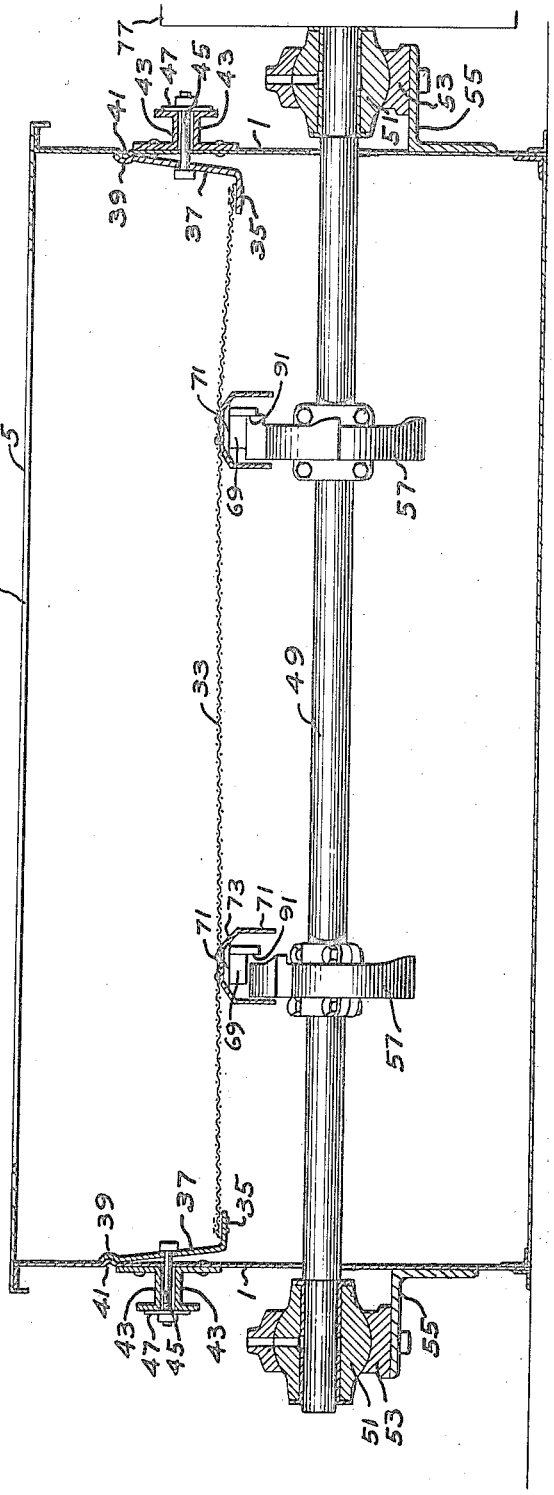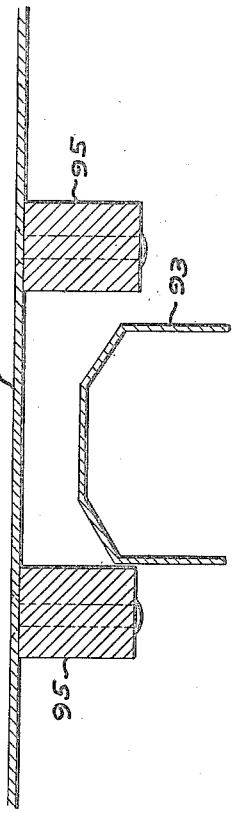

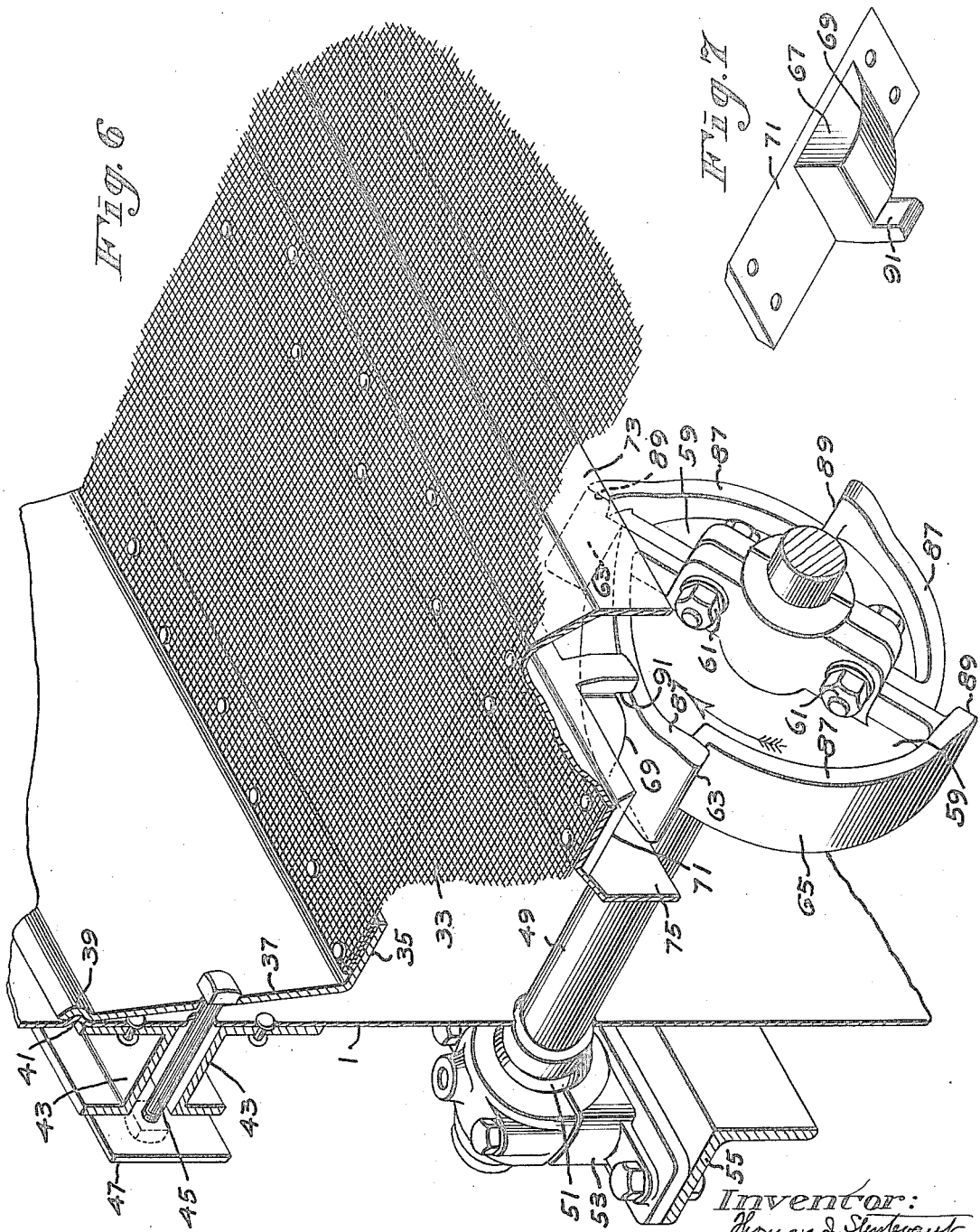

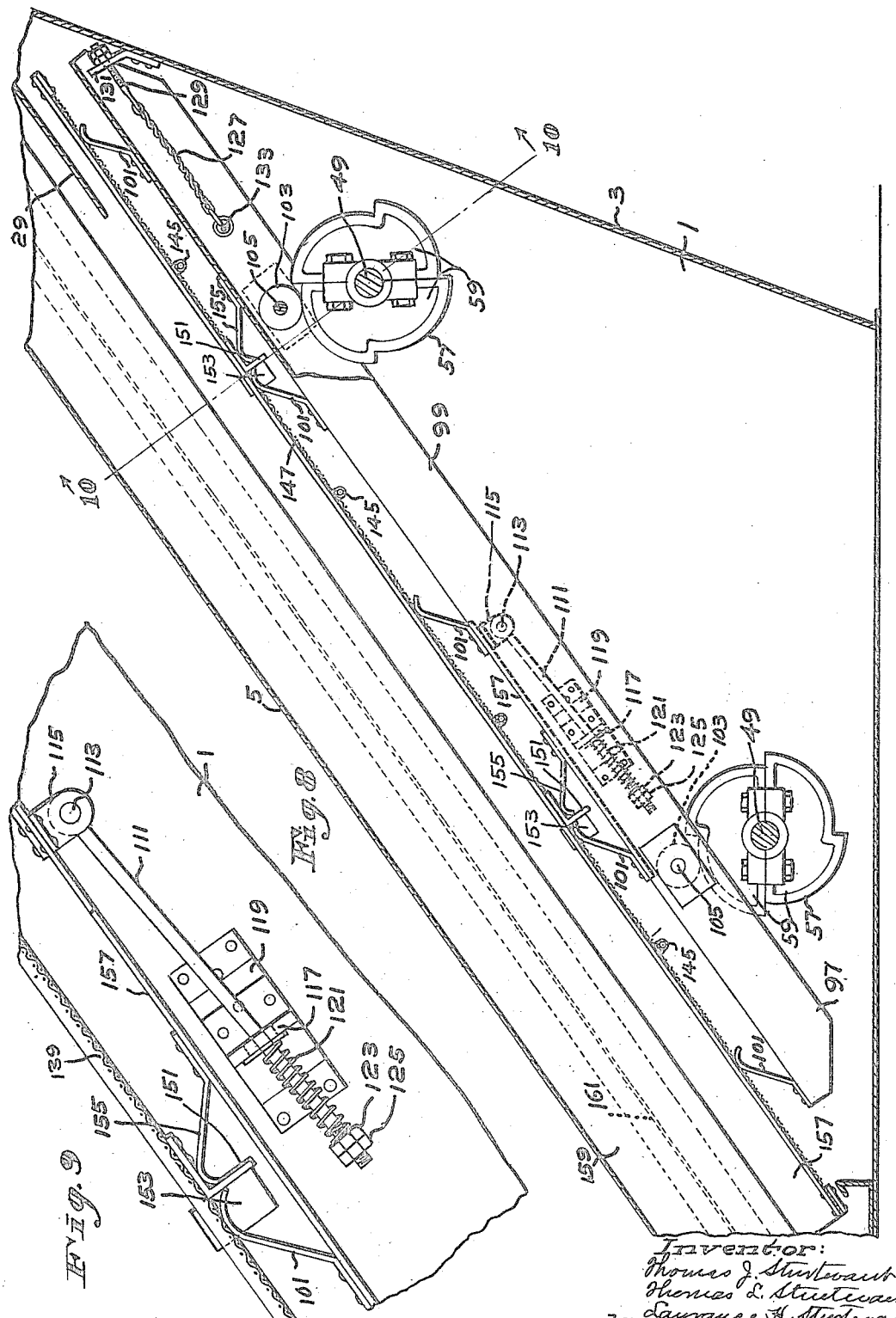

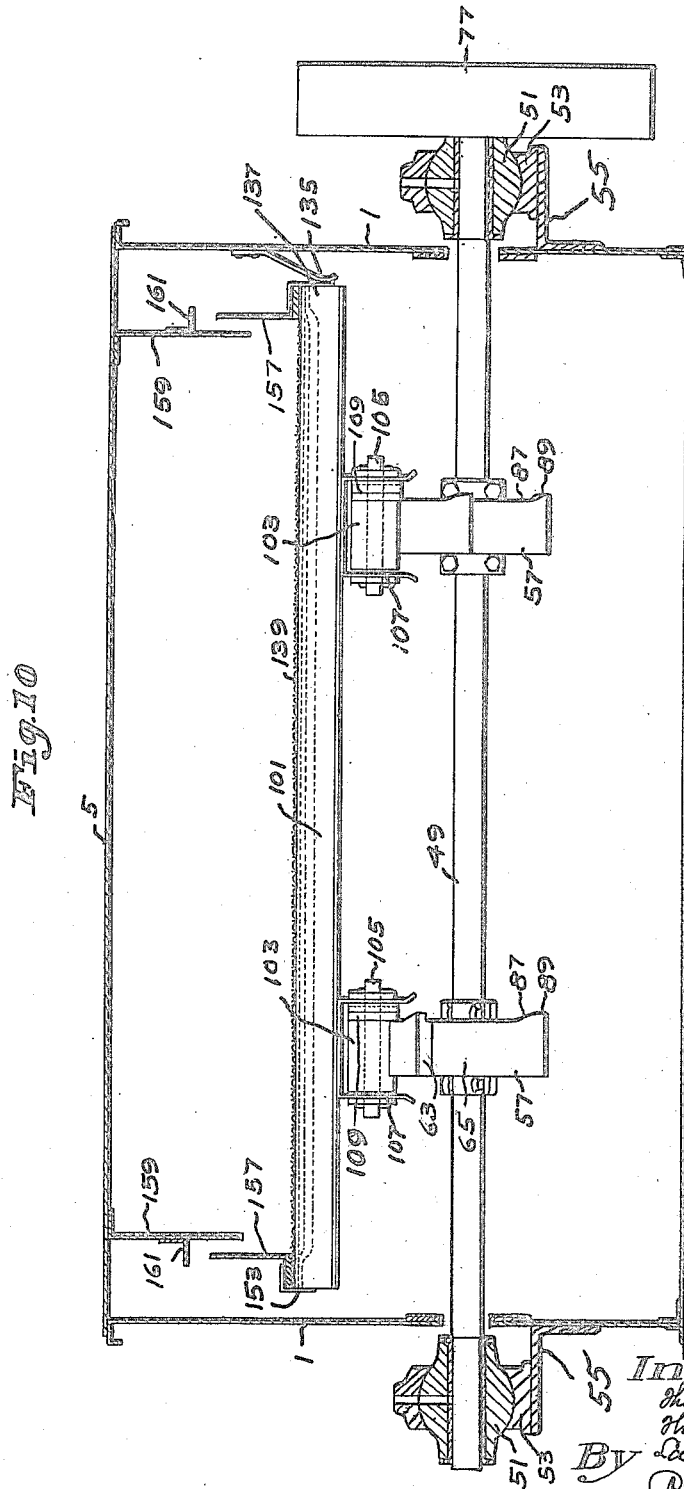

THOMAS L. STURTEVANT, OF QUINCY, AND THOMAS J. STURTEVANT, OF WELLESLEY, MASSACHUSETTS, AND LAURANCE H. STURTEVANT, OF TEMPLE, NEW HAMPSHIRE, ASSIGNORS TO STURTEVANT MILL COMPANY, OF BOSTON, MASSACHUSETTS, A CORPORATION OF MASSACHUSETTS.

SEPARATOR.

1,397,336.  Specification of Letters Patent.  Patented Nov. 15, 1921.

Application filed July 29, 1919. Serial No. 314,050.

*To all whom it may concern:*

Be it known that we, THOMAS L. STURTEVANT, THOMAS J. STURTEVANT, and LAURANCE H. STURTEVANT, citizens of the United States, residing at Quincy and Wellesley, both in county of Norfolk, State of Massachusetts, and Temple, county of Hillsborough, State of New Hampshire, respectively, have invented an Improvement in Separators, of which the following description, in connection with the accompanying drawings, is a specification, like characters on the drawings representing like parts.

The invention to be hereinafter described relates to separators for grading materials. One good form of separator comprises a casing having a feed box at the upper end thereof in which a screw conveyer is mounted, and serves to feed materials admitted at one end of the box along the length thereof, and over a feed board extending the length thereof. The materials fall thence on to an inclined baffle board which directs the same to an inclined screen or screens mounted in the casing.

Various means have been employed for shaking or vibrating the screen to maintain the meshes thereof free and open for efficient grading effect. Certain classes of materials, however, have such an adhesive or cohesive character that it has been difficult, if not impossible to provide a vibrating mechanism for the screen which would effectively maintain the meshes thereof in free open condition for efficient grading effect. One of the objects of the present invention, therefore, is to provide simple and effective means for shaking or vibrating a screen to maintain the meshes thereof in open condition for grading material of the character referred to. In carrying this feature of the invention into practical effect, in the present instance, means is provided for imparting vibrations to the screen in a number of different directions.

The baffle feed board or equivalent member referred to, usually projects somewhat over the screen, in order that the materials sliding down along the feed board may be sure to strike the upper surface of the screen. Another object of the invention is to provide for interengagement of the baffle feed board and screen on vibration of the screen, which may have a reactive influence affecting the character of the vibration thereof, and which may produce tremors in the baffle feed board for promoting and distributing the flow of materials along the same.

It is desirable in separators to be able to readily remove the screen from its casing for the purpose of inspection, adjustment or repair thereof, or to substitute a new screen for an old one which has become worn. Another object of the invention, therefore, is to provide a screen supporting frame which may remain in the casing of the separator, and to provide a screen which may be mounted on the supporting frame, but free and independent thereof, so that it may be readily lifted therefrom without disturbing the supporting frame.

Since the screen may be free and independent of the supporting frame therefor, screens of varying mesh may readily be employed, and a finer screen may be substituted for a coarse screen, or vice versa, without interfering with the supporting frame for the screen. If a screen of very fine mesh is to be used, it is desirable that it may not only be supported at the margins thereof, but also at distributed points throughout the area thereof within the margins. Another object of the invention, therefore, is to provide a screen having clothing of fine mesh superimposed upon but spaced from clothing of coarse mesh, both of which may be desirably secured to the same frame. The construction is such that the large meshes of the coarse screen may support the fine screen at distributed points, but without substantial obstruction to the grading surface of the fine screen.

The screen clothing employed in grading certain classes of materials is of such a fine mesh and delicate character that it is desirable to avoid striking the clothing or bringing devices in contact therewith for vibrating the clothing, since such devices are liable to stretch the clothing locally, produce sag spots therein, or rupture or wear the clothing. Also, if these devices are mounted above the clothing, they interfere to a certain extent with the flow of materials along the clothing, and reduce the area thereof which will be effective for grading purposes. Another object of the invention, therefore, is to provide a mechanism for vibrating the screen clothing which will vibrate the same uniformly throughout and avoid contact with the clothing.

With the aforesaid and other objects in view, the character of the invention will be best understood by reference to the following description of selected embodiments thereof, shown in the accompanying drawings, wherein:

Figure 1 is a front elevation of a separator embodying the invention;

Fig. 2 is a vertical section taken on line 2—2 of Fig. 1;

Figure 11:
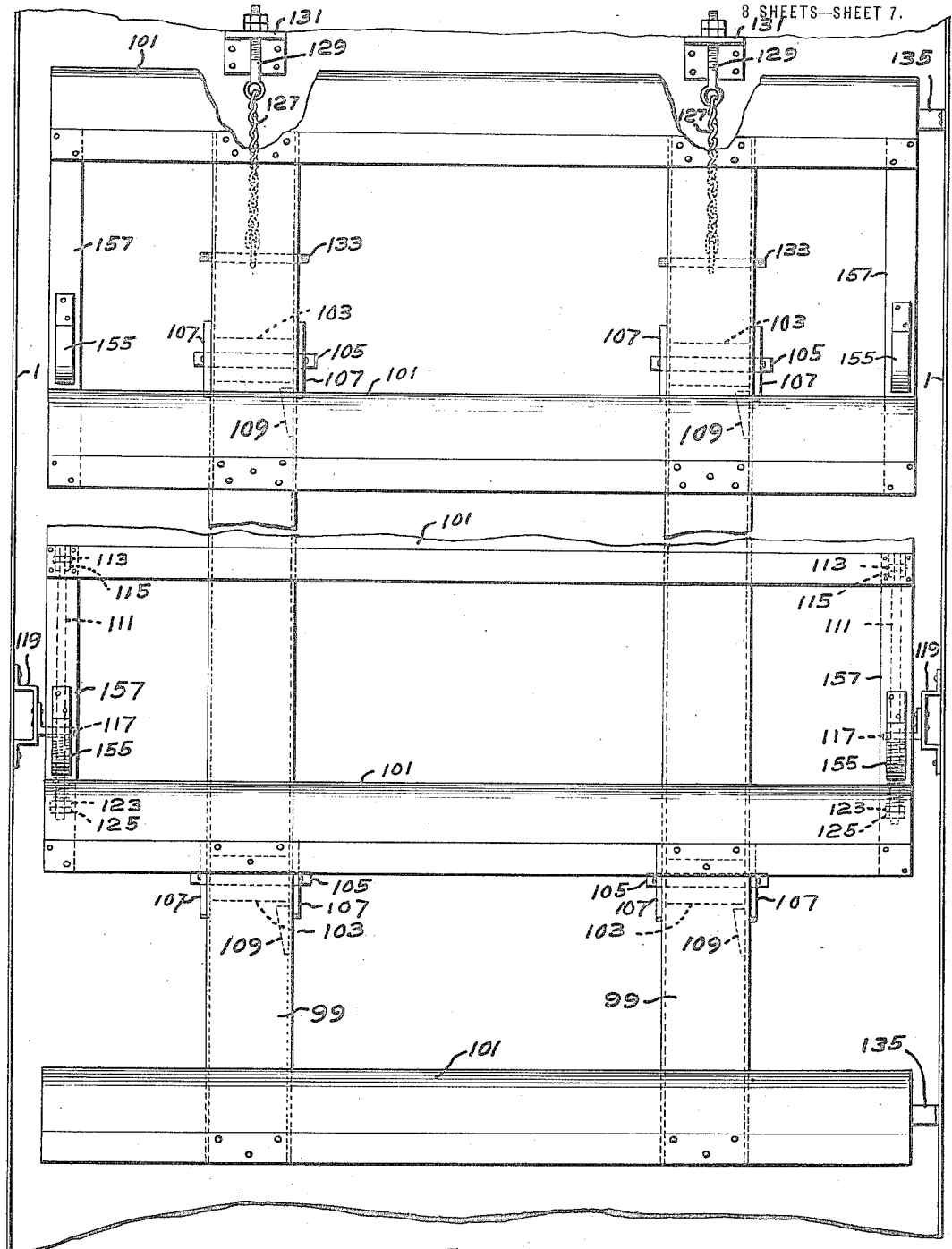
Figure 12:
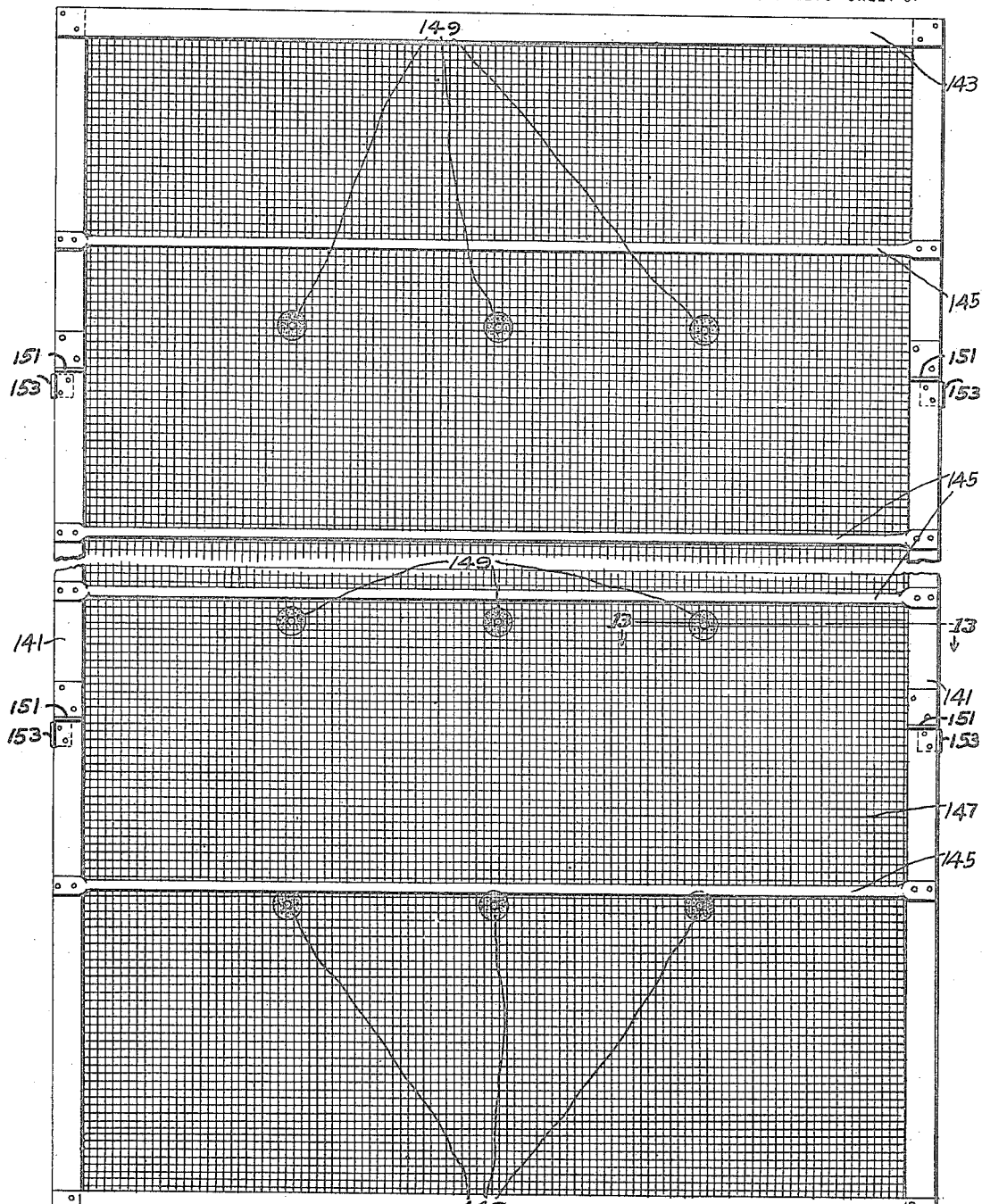
Figure 13:
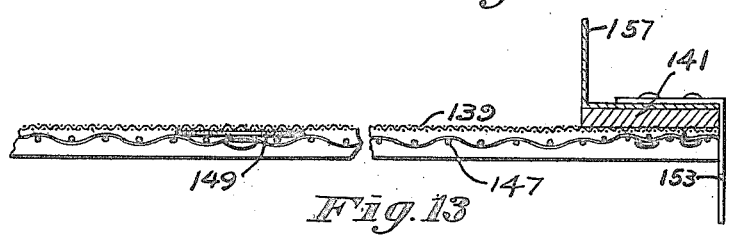

Fig. 3 on an enlarged scale is a sectional detail showing the interengaging devices of the baffle feed board and screen for transmitting vibrations from the latter to the former;

Fig. 4 on an enlarged scale is a transverse section taken on line 4—4 of Fig. 2;

Fig. 5 is a sectional detail to be referred to;

Fig. 6 is a perspective view of a portion of the separator partly in section and having parts broken away to disclose parts beyond the same;

Fig. 7 is a perspective view of a device coöperating with the cam to vibrate the screen;

Fig. 8 is a vertical section through a modified form of separator embodying the invention;

Fig. 9 is a detail showing spring means for urging the screen supporting frame downward on the cams;

Fig. 10 is a transverse section taken on the line 10—10 of Fig. 8;

Fig. 11 is a plan of the separator shown in Fig. 8, with the screen removed to disclose its supporting frame beneath the same;

Fig. 12 is a bottom view of the screen having fine clothing and coarse clothing beneath the same to furnish support thereto at distributed points; and Fig. 13 on an enlarged scale is a vertical section taken on line 13—13 of Fig. 12.

Referring to the drawings, and more particularly to Figs. 1 to 7 thereof, the separator shown therein as embodying the invention, comprises a casing having side walls 1, rear wall 3, and a cover or member 5 connected by hinges 7 with the upper end of the casing, the lower edge of said cover being adapted to rest upon an angle bar 9 extending transversely of the casing adjacent the lower end thereof. The cover may have a large opening 11 therein normally closed by a roller curtain 13 of canvas or other suitable flexible material stiffened at intervals by battens 15 extending transversely thereof. The curtain may be provided with eyes 17 at the lower edge thereof, adapted to be inserted over hooks 19 to secure the same in closed position. The roller for the curtain may be provided with a spring device of usual construction which will automatically roll up the curtain when the lower edge thereof is released. This curtain may be readily raised from time to time as desired to permit ready inspection of the screen and to admit a broom for sweeping the upper surface of the screen.

Mounted on the upper end of the casing is a feed box 21 containing a screw conveyer 23 adapted to feed the materials along the box and over a feed board 25. The materials flowing over this board pass through a throat 27 and strike an inclined baffle feed board 29 having its upper edge riveted or otherwise secured to an angle 31 on the casing. The lower edge of this baffle feed board may project somewhat over the screen to be described, and be susceptible of flexion or vibratory movement.

Any suitable form of screen may be employed, but in the present instance, a screen is shown comprising screen clothing 33 having opposed margins thereof riveted or otherwise secured to flanges 35 of side curtains or plates 37 (Fig. 4) preferably of resilient material. The lower ends of these side plates are spaced inward from the side walls of the casing, and said plates incline upwardly and outwardly, and are fulcrumed to said side walls at the upper edges thereof. In the present instance, the upper edges of the said plates are formed to present grooves 39 extending longitudinally of said plates and receiving ribs 41 which may conveniently be pressed inward from the side walls of the casing.

Suitable means may be provided for stretching the screen clothing. To accomplish this, in the present instance of the invention, pairs of channels 43 are secured to the outer faces of the side walls of the casing, and spaced apart to receive bolts 45 disposed at suitable intervals, and having heads engaging the inner sides of the plates 37, and nuts engaging washers 47 resting against the outer edges of the channels 43.

The construction is such that the bolts may be tightened to hold said plates and grooves 39 against the fulcrum ribs 41, and to rock said plates outwardly toward the side walls of the casing to produce the tension of the screen clothing 33 desired.

Next will be described the means for vibrating the screen. This means, in the present instance of the invention, comprises a pair of cross shafts 49 extending transversely of the casing through openings in the side walls thereof. The ends of these shafts are journaled in bearings 51 of ball form received by similarly curved cups 53 mounted on angle bars 55 having their opposite ends secured to the side walls of the casing. The angle bars 55 being secured merely at their ends will allow a certain amount of flexion or sagging thereof to admit vibration of the shafts bodily, and the ball and socket mounting for the ends of the shafts will admit such movements of the shafts without binding in their bearings, but will confine the shaft against axial movement.

Mounted on the shafts are cams 57 (Fig. 6), each conveniently formed of two parts 59 clamped to the shafts by bolts 61. To impart up and down vibrations to the screen, each cam may have drop shoulders 63 formed on the periphery thereof, and curved portions 65 of varying radius between the drop shoulders. Coöperating with each cam there may be a follower or bearing lug 67 (Figs. 6 and 7) having a tapered or curved surface 69 for engagement with the periphery of the cam, said follower being fast on an attaching plate 71.

Extending longitudinally of the screen at positions corresponding with the locations of the cams, are longitudinally flexible, resilient channels or equivalent members 73 which may have their backs riveted or otherwise secured to the screen clothing, and flanges 75 depending from said backs at opposite sides of the cams. The follower plates 71 are riveted or otherwise secured to the under faces of the backs of these channels.

The cam shafts may be provided with suitable means for rotating the same, in the present instance, pulleys 77 (Fig. 1) for this purpose being mounted on ends of said shafts projecting beyond the bearings at one side of the casing. These pulleys are connected by a belt 79, and one of the shafts has a driving pulley 81 thereon connected by a belt 83 with a pulley 85 on the shaft of the screw conveyer referred to.

The construction is such that when the cams are rotated, their peripheral portion 65 will wipe past the followers 67 until the drop shoulders 63 reach the ends of said followers, when the followers will drop sharply downward until limited by engagement with said peripheral portions 65. Thus, the cams will produce a positive up and down vibration of the screen clothing. The relation of the cams to the screen is such that the screen will be thrust upward intermediate the side edges thereof, when the peripheral portions 65 of the cams are wiping against the followers 67, and the screen will be tensioned and pulled on the side plates 37 supporting the edges of the screen, and since these plates are of resilient material, they may flex inward or rock inward on the fulcrum ribs 41 to prevent undue strain on the clothing. When the cams have rotated to bring their drop shoulders 63 beyond the followers, the screen thus tensioned will snap sharply downward, and thus a positive efficient vibration of the screen is effected.

The upper and lower edges of the screen clothing may be free, and therefore, the entire area of the screen clothing between the side plates to which its edges are connected may vibrate throughout. The followers 67 may continuously engage the cams, and thus the cams through the followers and the channel bars support the clothing intermediate the opposed side edges thereof and limit sagging of the screen.

Under certain conditions it is desirable that the screen clothing shall not only receive the up and down vibrations described, but that it also shall receive lateral vibrations. To accomplish this, in the present instance of the invention, each of the cams may be provided with edge portions 87 inclined or curved with respect to the plane of the body of the cam and terminating in shoulders 89. Coöperating with these edge portions and shoulders is a lateral follower conveniently in the form of a lug 91 (Figs. 6 and 7) depending from the followers 67 referred to.

The construction is such that in the course of the rotation of the cam, the edge portions 87 thereof will wipe against the follower lug 91 and shift the screen laterally toward the right of Fig. 6, thereby tensioning the side plate 37 at the left of Fig. 6. When the cam has been rotated sufficiently to move the shoulder 89 past the follower lug 91, the screen will snap sharply to the left of Fig. 6 until limited by the follower lug 91.

Thus, by the peripheral and lateral shoulders of the cams, a composite vibration of the screen is effected, including both up and down and lateral movements, and the vibrations are of such a positive character that the screen clothing is maintained in open condition for efficient grading effect.

Next will be described devices whereby vibrations of the screen may be transmitted to the baffle feed board 29 referred to. To accomplish this, in the present instance, the channels 71 are provided with upper end portions 93 (Figs. 2, 3 and 5) which project somewhat beyond the upper edge of the screen clothing, and between blocks or abutments 95 secured to the baffle feed board at the under side thereof, and at opposite sides of the channels, as will be noted in Fig. 5. The construction is such that when the screen is vibrated, the upper end portions 93 of the channels will strike the under side of the baffle feed board, and when the screen is shifted laterally, said channel portions will strike the sides of the blocks 95. As a result, the baffle feed board will receive up and down and lateral tremors which will promote the flow and distribution of the materials along the same and desirably deliver materials. Also, the channels in striking the baffle feed board may receive a reactive effect therefrom which may contribute to the vibration of the screen.

While in the present instance of the invention, two channels and four cams are provided for vibrating the screen, it will be understood that any number thereof may be used as desired. It will also be understood that the number of shoulders or projections on the cams may be varied, and where two shafts are employed, the cams of the respective shafts may be rotated so that their shoulders will pass the followers in unison or out of step as desired.

As stated, it is desirable to be able to readily remove the screen for the purpose of inspection, adjustment and repair thereof, or for the purpose of substituting one screen for another. Next will be described a support for the screen which will permit the screen to be mounted thereon and lifted therefrom at will as desired. This support, in the present instance of the invention, is in the form of a frame 97 (Figs. 8 to 11) having a pair of longitudinal channels or members 99 connected by transverse bars or members 101, in the present instance, having edges riveted or otherwise secured to the longitudinal channels, and opposite edge portions transversely curved upward, as will be noted in Fig. 8. These transversely curved members 101 may be of resilient material and furnish a yielding support for a screen to be described.

This screen supporting frame may be mounted on and vibrated by cams which may have peripheral and lateral shoulders such as already described. To reduce friction and wear, however, followers of different form may be employed for the cams. In the present instance, each of the cams is provided with a follower in the form of a roller 103 adapted to coöperate with the peripheral portions and shoulders of the cam, said roller being mounted on a pin 105 projecting through the depending flanges of the channel 99, and secured by pins and washers 107 engaging the outer faces of the channel flanges. The follower for coöperation with the lateral shoulders of the cam, in the present instance, is in the form of a wedge shaped block 109 secured to the inner face of one of the flanges of the channel. The construction is such that in the course of rotation of the cam, the peripheral and lateral shoulders thereof will pass the roller and wedge block respectively, substantially simultaneously.

The cams may be mounted on the shafts so as to rotate in either direction, but in the present instance the screen supporting frame rests upon and is supported by the cams, and is freely moved by the cams. The direction of rotation of the cams is such that it tends to drag the screen supporting frame upwardly while the curved peripheral portions of the cams are passing the followers. Suitable means may be provided to pull said frame backward when the cams have rotated sufficiently to cause their shoulders to pass the followers. This means, in the present instance, comprises eye bolts 111 having eyes mounted on pins 113 in U-shaped brackets 115 secured to the under sides of certain of the cross bars 101 adjacent the ends thereof. Said bolts project downward through and beyond lugs 117 on brackets 119 secured to the side walls of the casing. Coil springs 121 encircle said bolts and are confined between the lugs 117 and adjusting nuts 123 secured by lock nuts 125 on the ends of said bolts. The construction is such that the springs reacting against the bracket lugs 117, tend constantly to pull the eye bolts and the screen supporting frame downward.

Suitable means may be provided to limit the downward movement of the screen supporting frame. This means, in the present instance, is in the form of a pair of chains 127 having their upper ends secured to eye bolts 129 connected to brackets 131 on the rear wall of the casing, the lower ends of said chains being connected to pins 133 projecting through the flanges of the channel bars 99 adjacent the upper ends thereof.

The construction is such that the rotation of the cams will drag the screen supporting frame upward, thereby increasing the tension on the eye bolt springs 121 until the shoulders of the cams pass the followers, whereupon the springs will jerk the frame back downward until suddenly arrested by the chains 127 which, of course, are slackened when the screen frame is dragged upward. The inclination of the screen supporting frame and the weight thereof will tend to cause the screen to move downward and cause the frames to rest upon the cams under the influence of gravity.

The lateral edges and shoulders of the cams will tend to shift the screen supporting frame toward the right of Figs. 10 and 11. To shift said frame back to the left when the cams have rotated to cause their lateral shoulders to pass the wedge followers 109, suitable means may be provided, in the present instance, in the form of leaf springs 135 having their upper ends secured to the side walls of the casing, and their lower free ends adapted to wipe against wear plates 137 secured to the right ends of the upper and lowermost cross bars 101.

Any suitable screen or clothing may be mounted upon the screen supporting frame described. In the present instance of the invention, the screen for this purpose comprises screen clothing 139 (Fig. 12) stretched on a frame comprising side bars 141 and end bars 143. To prevent the side bars from curving inwardly intermediate their ends, suitable transverse brace members may be employed, conveniently in the form of tubular bars 145 having their ends flattened and secured to the side bars 141 of the frame. The brace bars 145 are preferably located beneath the screen clothing, and may be bowed or transversely offset somewhat from the screen clothing to tend to spread the side frames and stretch the clothing, as will be noted in Fig. 10. Said bars avoid interference with the vibration of the screen clothing, and avoid obstruction of the screen clothing.

If fine, delicate screen clothing is to be employed, it may be strengthened and supported by screen clothing 147 (Fig. 13) of large mesh located beneath the fine screen clothing and secured to the frame therefor. Preferably, the fine clothing and the coarse screen clothing beneath it, should not engage each other, to reduce the wear thereon and prolong the life thereof. To prevent such engagement, suitable spacing devices may be employed, in the present instance, in the form of disks 149 distributed at suitable intervals on and secured to the upper surface of the coarse clothing 147.

The screen described may be mounted on the screen supporting frame with the side bars 141 of the screen resting on the transversely curved cross bars 101 of the screen supporting frame. Suitable means may be provided to prevent the screen from sliding downward. This means, in the present instance, is in the form of angle brackets 151 (Fig. 8) secured to the under faces of the side bars 141, and having flanges adapted to engage the upper edges of the transverse curved cross bars 101. To prevent lateral movement of the screen with respect to the screen supporting frame, angle brackets 153 may be secured to the side bars 141 of the screen frame, and may have flanges for engagement with the ends of the cross bars 101.

As stated, the cams described are caused alternately to drag the screen supporting frame upward, and the eye bolt springs 123 will yank said frame downward. In order that the screen may share these movements of the screen supporting frame, curved leaf spring 155 may be provided having ends secured to bars 157 (Fig. 11) connected to certain of the cross bars 101 adjacent the ends thereof, and the free ends of said leaf springs 155 may project toward the free edges of said cross bars and be spaced slightly therefrom so as to admit the depending flanges of the brackets 151 between them.

The construction is such that the screen may be readily lifted from the screen supporting frame without the necessity for release of any connecting or attaching devices. It is merely necessary for this purpose to grasp the screen and lift it from the supporting frame. The screen may be mounted on the screen supporting frame with equal ease, since it is merely necessary to present the screen to the screen supporting frame with the flanges of the angle brackets 151 between the upper curved ends of the cross bars 101, and the leaf springs 155.

The channels 99 of the screen supporting frame may project upward somewhat beyond the screen and coöperate with the baffle feed board in a manner similar to that described for the first screen referred to.

To prevent the material delivered from the baffle feed board to the upper surface of the screen from escaping over the sides of the screen, the side bars 141 may be provided with upright plates 157 (Fig. 10), and the cover of the casing may be provided with plates 159 secured to and depending from the under face of the cover. The plates 157 and 159 may be offset from one another and overlap somewhat to allow vibration of the screen, but prevent escape of the materials over the sides of the screen. These plates may also engage to limit side movement of the screen. In some instances it may be desirable to secure angle bars 161 to the plates 159 to limit upward movement of the screen, and when such angle bars are employed and are engaged by the plates 157, they may further contribute to the vibration of the screen.

By the construction described, a vigorous shaking or vibration of the screen is effected. The peripheral curved portions and shoulders of the cams will alternately lift and drop the screen supporting frame and screen, and will reciprocate the screen supporting frame and screen in the general direction of the plane thereof up and down, and the lateral edges and shoulders of the cams and the springs 135 will reciprocate the screen supporting frame and screen laterally. The screen may be further vibrated with its engagement with the baffle feed board, and by the engagement of the side plates 157 with the angle bars 161 on the plates depending from the cover. The screen will follow more or less closely the up and down movements of the screen supporting frame, depending on the weight of material on the screen. In a sense the screen is a floating screen and is more or less independent of the screen supporting frame, and it may lag behind the movements of the screen supporting frame, owing to the fact that the screen is resiliently supported by the cross bars 101, and rests thereon under the influence of gravity.

The screen is spaced a substantial distance above the channels 99 by the transversely curved cross bars 101, and therefore, said channels will not interfere with the passage of the material through the screen. The upper curved portions of the cross bars engaging the side bars of the screen do not offer substantial obstruction to the screen clothing.

When the screen is thrown upward in the course of the vibration thereof, it tosses the material upward therefrom, and the material on return to the screen, strikes the same at a point a substantial distance beneath the point from which it was thrown. Thus, it is thrown over a portion of the screen without contact therewith, and grading effect by such portion is lost, but since the screen is intermittently shifted upward in the direction of the plane thereof by the dragging action of the cams referred to, the loss of such portion of the screen is in a measure compensated for.

Since the cams are located directly beneath the channels, and the flanges of the channels project downward somewhat over the sides of the cams, they desirably deflect the material away from the cams and tend to prevent material from contact with the surfaces of the cams engaging the followers, and thereby materially protect the cams from wear which would result if the material came in contact with said surfaces.

In grading certain classes of material, it is desirable that the screen should be housed in a closed casing to prevent escape of dust therefrom, but in grading materials of moist or sticky character it is unnecessary to provide a closed casing. Therefore, it will be understood that the term "casing" in the claims, is generic to either a closed casing or a more or less open casing or frame.

By our invention there is provided a strong, simple mechanism for efficiently vibrating the screen, so as to keep the meshes thereof open and free for efficient grading effect, both when materials of dry and moist or adhesive or cohesive character are treated.

It will be noted that the upper surface of the screen is substantially free and unobstructed throughout, the entire area thereof is available for screening purposes, the upper surface may be swept clean as desired without any devices to obstruct the free sweeping thereof, and the devices for vibrating the screen clothing do not come in contact therewith, and therefore, the life of the clothing is desirably prolonged. When it is desired to remove the screen, it is merely necessary to swing the casing cover to its open position, and then the screen may be easily lifted from the screen supporting frame and returned thereto without the necessity for release of connecting or securing devices. Also, by release of the spring actuated bolts 111 and the limiting chains 127, the screen supporting frame may be removed from the casing to furnish ready access to all parts thereof and to the cams beneath it.

It will be understood that the invention is not limited to the specific embodiment shown, and that various deviations may be made therefrom without departing from the spirit and scope of the appended claims.

What is claimed is:—

1. A separator for grading materials, comprising, in combination, a casing, a screen mounted therein, a hopper, a feed plate to guide materials from said hopper to said screen, and means to vibrate said screen with up and down and side motions into intermittent contact with said plate to produce vibrations of said screen and distributing vibrations of said plate.

2. A separator for grading materials, comprising, in combination, a casing, a screen mounted therein, a feed plate for delivering material to said screen, a longitudinal member extending along the screen and connected thereto, a cam coöperating with said longitudinal member to impart lateral vibrations to the screen, said longitudinal member arranged to strike the feed plate to vibrate the same and to promote further vibrations of the screen.

3. A separator for grading materials, comprising, in combination, a casing, a screen supporting frame, screen clothing supported by said frame, cams positioned below said frame within the downwardly-projected area of the screen clothing and arranged to support the frame at at least four points, said cams provided with lateral shoulders for intermittently shifting the frame laterally in one direction, and spring means for shifting the frame laterally in the opposite direction.

4. A separator for grading materials, comprising, in combination, a casing having an inclined cover with a large opening therein, a flexible roll curtain to cover or uncover said opening to enable ready access to said screen, means for retaining the curtain stretched over said opening, an inclined screen mounted within the casing beneath said cover, and means to vibrate said screen.

5. A screen for a separator, comprising a frame, screen clothing of fine mesh secured to said frame, supporting clothing of coarse mesh secured to said frame in stretched condition beneath the clothing of fine mesh to support the latter throughout its active screening area, spacing means between the fine and coarse clothings to support the former from the latter, said spacing means being arranged at distributed points throughout the screening area of the clothing and secured to but one of the separate clothings to permit relative movement of the clothings, and means for vibrating the clothings without contacting therewith.

6. A separator for grading materials, comprising, in combination, a casing, a screen mounted therein, a feed plate for delivering materials to the screen, a longitudinal support extending lengthwise of the screen to support the same, means for imparting vibrations to the longitudinal support and through the support to the screen, said support arranged to strike the feed plate to vibrate the same and to promote further vibrations of the screen.

7. A separator for grading materials, comprising in combination, a casing, a screen mounted therein, a shaft extending across the casing and having portions projecting through opposed walls of the casing, cams on said shaft positioned to support the screen and impart vibrations thereto, bearings for said shaft portions located externally of said walls, and means yieldingly supporting said bearings.

In testimony whereof, we have signed our names to this specification.

THOMAS L. STURTEVANT.
THOMAS J. STURTEVANT.
LAURANCE H. STURTEVANT.